(12) United States Patent
Sahm et al.

(10) Patent No.: US 8,489,306 B2
(45) Date of Patent: Jul. 16, 2013

(54) ENGINE SYNCHRONIZATION METHOD

(75) Inventors: Peter Sahm, Berlin (DE); Mattias Gruebe, Berlin (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 163 days.

(21) Appl. No.: 13/104,190

(22) Filed: May 10, 2011

(65) Prior Publication Data

US 2011/0288740 A1 Nov. 24, 2011

(30) Foreign Application Priority Data

May 10, 2010 (DE) .......................... 10 2010 020 024

(51) Int. Cl.
*G06F 19/00* (2011.01)
*G06G 7/70* (2006.01)

(52) U.S. Cl.
USPC ............................................ 701/100; 701/99

(58) Field of Classification Search
USPC .................................................. 701/99, 100
See application file for complete search history.

(56) References Cited

U.S. PATENT DOCUMENTS

| | | | |
|---|---|---|---|
| 3,161,021 A | 12/1964 | Tyler et al. | |
| 3,368,346 A * | 2/1968 | Warne | 60/39.15 |
| 3,526,091 A * | 9/1970 | Schuster | 60/791 |
| 3,854,287 A * | 12/1974 | Rembold | 60/236 |
| 4,875,168 A | 10/1989 | Martin | |
| 4,947,643 A * | 8/1990 | Pollak et al. | 60/236 |
| 5,224,340 A * | 7/1993 | Snow | 60/224 |
| 5,269,134 A * | 12/1993 | Menioux | 60/224 |
| 6,611,748 B2 * | 8/2003 | Greene | 701/100 |
| 6,712,314 B2 * | 3/2004 | Stephan | 244/53 R |
| 7,284,420 B2 * | 10/2007 | Rouse et al. | 73/170.02 |
| 2001/0023582 A1 * | 9/2001 | Nagel | 60/204 |
| 2002/0117582 A1 | 8/2002 | Stephan | |
| 2009/0060717 A1 | 3/2009 | Shilo et al. | |

FOREIGN PATENT DOCUMENTS

| | | |
|---|---|---|
| EP | 1215383 | 6/2002 |
| GB | 2095755 | 10/1982 |

OTHER PUBLICATIONS

German Search Report dated Jun. 20, 2011 from related foreign application.

* cited by examiner

*Primary Examiner* — Khoi Tran
*Assistant Examiner* — Rachid Bendidi
(74) *Attorney, Agent, or Firm* — Timothy J. Klima; Shuttleworth & Ingersoll, PLC

(57) ABSTRACT

This invention relates to an engine synchronization method for aircraft equipped with at least two gas-turbine engines, where the respective speeds N1 of the low-pressure compressor spools of the gas-turbine engines are determined and a difference value N1 is calculated and subsequently on the basis of this difference value at least one trim value is calculated, on the basis of which, at least on one gas-turbine engine, a change of the setting is made, with subsequently the respective speeds N2 of the high-pressure compressor spools of the gas-turbine engines being determined and a difference value N2 being calculated and subsequently on the basis of this difference value, at least on one gas-turbine engine, the inlet temperature value T20, which is fed to the engine controller, being changed for synchronization.

20 Claims, 2 Drawing Sheets

State of the art

ENGINE SYNCHRONIZATION METHOD

This invention relates to an engine synchronization method for aircraft equipped with at least two gas-turbine engines.

On aircraft powered by gas-turbine engines, there is the need to synchronize the latter. If the engines do not run synchronously, cabin noise occurs which may be found annoying or unpleasant.

Synchronization of gas-turbine engines is known from the state of the art. It is accomplished on the basis of, for example, the engine pressure ratio (EPR), the speeds of the low-pressure spool (low pressure (LP) spool speed) or the speeds of the high-pressure spools (high pressure (HP) spool speed).

Such systems are provided in the synchronization device of the aircraft itself, i.e. they are furnished by the aircraft manufacturer, but not primarily by the gas-turbine engine manufacturer.

It is furthermore provided in the known systems that usually one engine is used as master engine and the other engine as slave engine. Accordingly, the slave engine is corrected on the basis of the values of the master engine.

A further method known from the state of the art is based on determining the average values between the values of the individual engines and throttling the engine with the higher values, while setting the engine with the lower values to higher values.

In a known system, synchronization is accomplished such that the throttle resolver angle (TRA) is determined and a respective trim value calculated which is fed to the electronic engine controller (EEC) to adjust the engine setting. However, such adjustment is only possible in the order of ±5 percent.

Already minor speed differences of 12 rpm, for example, result in a noise beat with a period of <5 s. Such a speed difference of only 12 rpm, although being very small in view of the actual operating speeds of the spools of a gas-turbine engine, already entails considerable problems.

It is therefore known from the state of the art to synchronize either the speeds of the low-pressure compressor spool or the high-pressure compressor spool. For this purpose, an option is offered to the pilot by the aircraft manufacturer. This option is however not freely available to the pilot, but rather an adjustment of the speed of the low-pressure compressor spools or the high-pressure compressor spools is given preference or proposed, in dependence of the respective engine power and flight conditions.

It is understood that the above procedures are also applicable to aircraft equipped with more than two gas-turbine engines.

An engine synchronization device is described in Specification U.S. Pat. No. 4,875,168 A, for example.

On two-spool engines, either the fan shaft or the compressor spool (low-pressure compressor spool or high-pressure spool) are synchronizable simultaneously. This incurs, however, that the other spool runs with a slight speed difference. This may result in noise beats, or beating noises, which are due to the noise or buzzing of the engines not having the same phase difference relative to each other. Such noise is found very unpleasant and annoying by the aircraft passengers.

In a broad aspect, the present invention provides an engine synchronization method of the type specified at the beginning, which, while being characterized by simple design, ease of application and operational safety, enables best possible synchronization.

It is a particular object of the present invention to provide solution to the above problems by a combination of the features described herein. Further advantageous embodiments of the present invention become apparent from the description below.

The method according to the present invention hereinafter described on the example of the synchronization of an aircraft equipped with two gas-turbine engines now provides that initially the respective speeds N1 of the low-pressure compressor spools are determined. A difference is calculated from the two speeds N1. Furthermore, a trim value is calculated on the basis of this difference enabling one or more of the engines to be adjusted or synchronized. Accordingly, the method according to the present invention is applicable to both the master-slave synchronization method and to a synchronization method in which both engines are set.

Trimming on the basis of the N1 values of the low-pressure compressor spools is accomplished such that, at least on one gas-turbine engine, a change of the settings of either the thrust setting values or the speed setting values is made. Setting is here made such that neither the throttle resolver angle of the aircraft is changed nor a control loop of the electronic engine controller directly affected. Rather, setting is made by the "auto throttle trim computer" which is part of the aircraft and provided by the aircraft manufacturer, but not by the engine manufacturer.

Upon synchronization of the speeds of the low-pressure compressor spools, a small amount of waiting time is allowed. Subsequently, according to the present invention, the speeds N2 of the high-pressure compressor spools of the gas-turbine engines are determined. A N2 difference is calculated on the basis of which synchronization is made on at least one of the gas-turbine engines.

For this purpose, the T20 value, which is fed to the engine controller, is changed according to this invention. The T20 value (Total Air Temperature (TAT)) is based on the air at the air inlet of the engine (inlet temperature). Moreover, further air data calculations are included in the T20 value, namely of air pressure, inflow velocity, aircraft speed and similar.

Thus, the speeds of the high-pressure compressor spools are adjustable on the basis of the T20 value without requiring the thrust setting values or the speed setting values of the electronic engine controller of the aircraft itself to be changed. The speeds of the high-pressure compressor spools are adjusted, for example, by the T20 value directly engaging the setting mechanism of the stator vanes via the NHRT26 carpet, thereby effectively controlling NH.

This control mechanism is independent of wear and aging states of an engine.

According to the present invention, application to existing engines/EEC's (electronic engine controllers) is possible. Synchronization of the low-pressure spool speeds and the high-pressure spool speeds can entirely be made on the aircraft side, so that no additional parameters or values must be fed to the engine or the EEC. Also, provision can be made for a division of the synchronization. In the first part of the synchronization method according to the present invention, synchronization is accomplished by means of the controls provided in the aircraft itself, while the second part of the synchronization method according to the present invention is accomplished by means of the engine controller provided by the engine manufacturer. Put simply, the speeds of the low-pressure spools are synchronized by the aircraft, while the speeds of the high-pressure spools are synchronized by the engines.

In the method according to the present invention, no selection is made by the pilot, but the method according to the present invention is essentially applicable to engine synchronization under all engine and flying conditions.

Trimming of the T20 value as provided by the present invention by, for example, 1.5 K results in a change of the speed of the high-pressure spool by approx. 0.15 percent. This corresponds to a speed change of approx. 25 rpm.

According to the present invention, it is particularly favourable if a trimming or change of the T20 signal is limited to prevent error messages from occurring. Here, a limitation to the sensor measuring accuracy is particularly favourable. This results in a limitation to changes of the T20 value to 1.25 K, for example.

The method according to the present invention enables both the fan speeds and the compressor spool speeds of gas-turbine engines to be simultaneously synchronized in a particularly easy and effective manner. Thus, vibrations are reduced, with improved comfort being obtained for both crew and passengers. Furthermore, the efficiency of the gas-turbine engines is improved, leading also to an increase in service life.

A further, essential advantage of the method according to the present invention lies in the fact that it is easily performable since the required data and data paths are already available, thereby dispensing with expensive, additional measures.

A further advantage lies in the fact that it is no longer required to offer, as known in the state of the art, two different synchronization methods and have them selected by the pilot. This results in improved operational safety and operability of the aircraft.

The present invention is more fully described in light of the accompanying flow charts showing a preferred embodiment:

Figure 1:
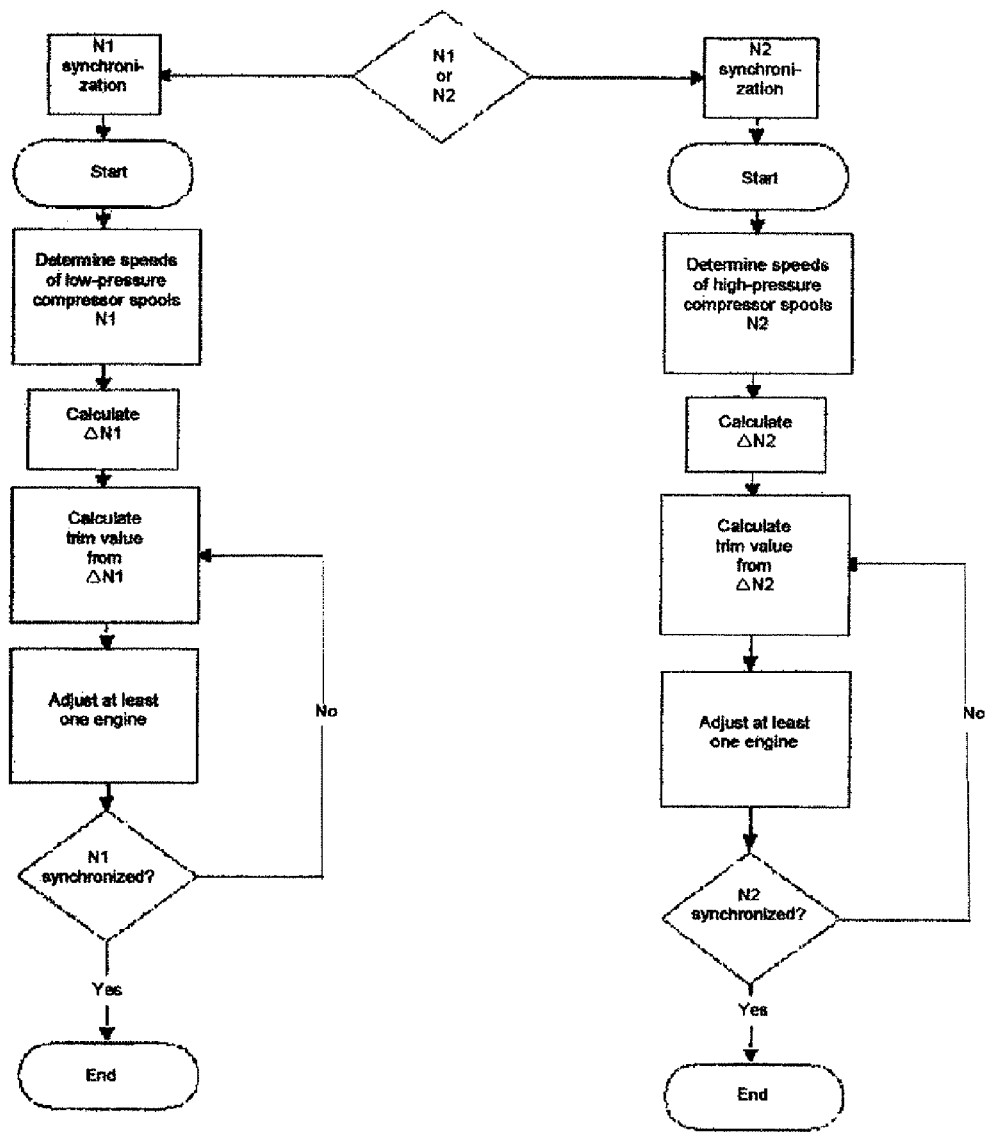
FIG. 1 is a flow chart in accordance with the state of the art.

As shown in FIG. 1, the pilot can select, in the state of the art, between synchronization of the speed of the low-pressure compressor spool N1 or the high-pressure compressor spool N2. This selection is not optional, but rather is proposed by the aircraft manufacturer in dependence of the respective operating conditions.

As shown in FIG. 1, the speeds of the respective compressor spools N1 or N2 are determined in each case. A difference $\Delta N1$ or $\Delta N2$ is calculated from which a trim value is calculated in the next step. By means of the trim value, a setting of the engine is made, either thrust setting or speed setting, to synchronize the speed N1 of the low-pressure compressor spool, or the stator vanes of the high-pressure compressor are varied to synchronize the speed N2 of the high-pressure compressor spool. As shown in FIG. 1, engine setting is repeated, if applicable several times, by a closed-loop control until synchronization of either the low-pressure compressor spool speed or the high-pressure compressor spool speed is obtained.

Figure 2:
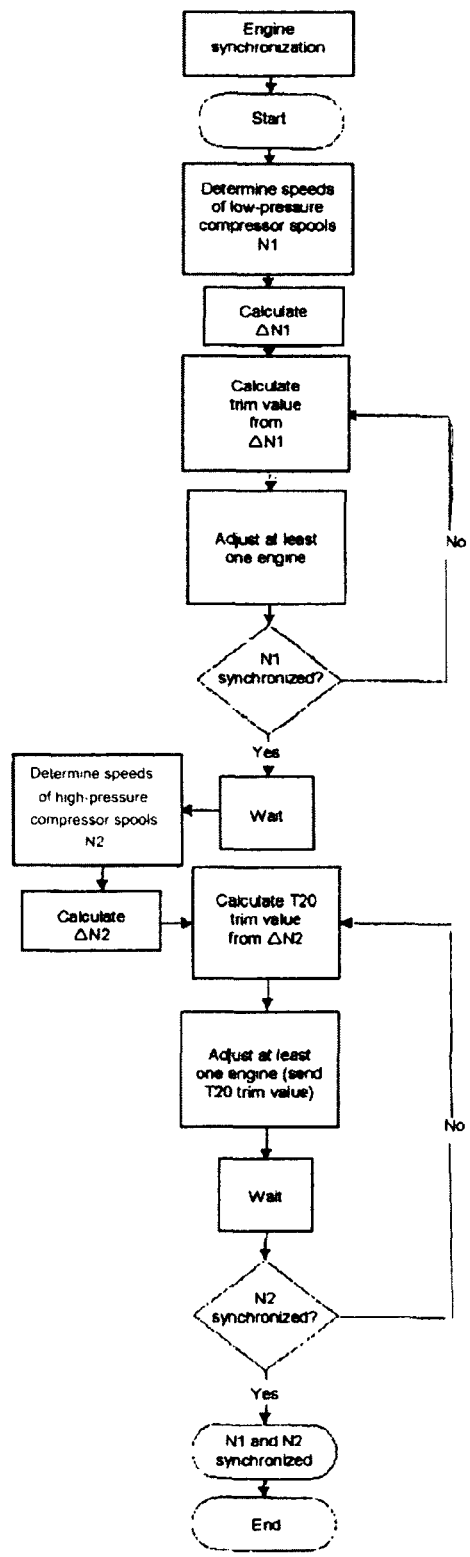
FIG. 2 is a flow chart of the method in accordance with the present invention.

FIG. 2 shows the engine synchronization method according to the present invention. In this method, the speeds N1 of the low-pressure compressor spools are initially determined and then the difference and, subsequently on the basis of this difference, the trim values are calculated. Then, the speed of the respective low-pressure compressor spool is synchronized via thrust setting or speed setting. This process is repeated until the low-pressure compressor spool speeds are synchronized. After a specified waiting time, the speeds N2 of the high-pressure compressor spools are then automatically determined, a difference calculated and, again, a trim value calculated therefrom. This trim value is, however, determined in the form of a change of the T20 value fed to the engine controller of the respective engine. Thus, the respective engine is adjusted on the basis of the T20 trim value with regard to its parameters. This process will be repeated, if applicable several times, until the speeds N2 of the high-pressure compressor spools are synchronized. Accordingly, at the end of the process, both compressor spools are synchronized, so that both engines run synchronously without causing the adverse effects known from the state of the art.

What is claimed is:

1. A method for synchronizing engines on an aircraft having at least two gas-turbine engines, comprising:
    determining respective N1 speeds of low-pressure compressor spools of the gas-turbine engines;
    calculating a difference value N1;
    subsequently calculating at least one trim value based on the difference value N1;
    synchronizing the N1 speeds by changing a setting on at least one of the gas-turbine engines based on the trim value;
    subsequently determining respective N2 speeds of high-pressure compressor spools of the gas-turbine engines;
    calculating a difference value N2;
    further synchronizing the gas-turbine engines by subsequently changing an engine air inlet temperature value T20 which is fed to an engine controller on at least one of the gas-turbine engines, based on the difference value N2.

2. The method in accordance with claim 1, and further comprising synchronizing at least one chosen from N1 speeds and N2 speeds by adjusting both gas-turbine engines.

3. The method in accordance with claim 2, and further comprising changing at least one thrust setting value for synchronizing the N1 speeds.

4. The method in accordance with claim 2, and further comprising changing the T20 value which is fed to the engine controller on at least one of the gas-turbine engines for synchronizing the N2 speeds.

5. The method in accordance with claim 2, and further comprising limiting a change of the T20 value to a measuring accuracy of at least one air data sensor determining the T20 value when synchronizing the gas-turbine engines.

6. The method in accordance with claim 3, and further comprising changing at least one speed setting value for synchronizing the N1.

7. The method in accordance with claim 6, and further comprising changing the T20 value which is fed to the engine controller on at least one of the gas-turbine engines for synchronizing the N2 speeds.

8. The method in accordance with claim 7, and further comprising limiting a change of the T20 value to a measuring accuracy of at least one air data sensor determining the T20 value when synchronizing the gas-turbine engines.

9. The method in accordance with claim 8, wherein the engine air inlet temperature value T20 is also based on at least one chosen from air pressure, inflow velocity and aircraft speed.

10. The method in accordance with claim 1, and further comprising synchronizing at least one chosen from N1 speeds and N2 speeds by leaving one of the gas-turbine engines, provided as a master engine, in a non-adjusted condition while adjusting another of the gas-turbine engines, selected as a slave engine.

11. The method in accordance with claim 10, and further comprising changing at least one thrust setting value for synchronizing the N1 speeds.

12. The method in accordance with claim 10, and further comprising changing the T20 value which is fed to the engine controller on at least one of the gas-turbine engines for synchronizing the N2 speeds.

13. The method in accordance with claim 10, and further comprising limiting a change of the T20 value to a measuring accuracy of at least one air data sensor determining the T20 value when synchronizing the gas-turbine engines.

14. The method in accordance with claim 11, and further comprising changing at least one speed setting value for synchronizing the N1.

15. The method in accordance with claim 14, and further comprising changing the T20 value which is fed to the engine controller on at least one of the gas-turbine engines for synchronizing the N2 speeds.

16. The method in accordance with claim 15, and further comprising limiting a change of the T20 value to a measuring accuracy of at least one air data sensor determining the T20 value when synchronizing the gas-turbine engines.

17. The method in accordance with claim 16, wherein the engine air inlet temperature value T20 is also based on at least one chosen from air pressure, inflow velocity and aircraft speed.

18. The method in accordance with claim 1, and further comprising changing the T20 value which is fed to the engine controller on at least one of the gas-turbine engines for synchronizing the N2 speeds.

19. The method in accordance with claim 18, and further comprising limiting a change of the T20 value to a measuring accuracy of at least one air data sensor determining the T20 value when synchronizing the gas-turbine engines.

20. The method in accordance with claim 1, and further comprising limiting a change of the T20 value to a measuring accuracy of at least one air data sensor determining the T20 value when synchronizing the gas-turbine engines.

* * * * *